United States Patent [19]

Densen

[11] 4,149,701
[45] Apr. 17, 1979

[54] TUBULAR FENCE

[76] Inventor: Karl T. Densen, 24, rue de Geneve, 01210 Ferney-Voltaire, France

[21] Appl. No.: 869,174

[22] Filed: Jan. 13, 1978

Related U.S. Application Data

[62] Division of Ser. No. 568,817, Apr. 17, 1975.

[30] Foreign Application Priority Data

May 2, 1974 [CH] Switzerland ................ 5974/74

[51] Int. Cl.$^2$ ........................................... E04H 17/16
[52] U.S. Cl. ........................................ 256/65; 52/665; 403/174; 403/246
[58] Field of Search ............... 256/24, 59, 65, 21, 256/22; 182/179; 403/217, 174, 178, 347, 194, 201, 246, 378, 379; 211/175, 191, 192; 248/122; 52/36, 280, 664, 726, 731, 665

[56] References Cited

U.S. PATENT DOCUMENTS

| 1,024,858 | 4/1912 | Kissinger et al. ................ 256/59 |
| 3,468,430 | 9/1969 | Lawman ..................... 211/191 X |
| 3,484,827 | 12/1969 | Hall ............................... 256/59 |
| 3,848,854 | 11/1974 | DeBarbieri .................. 256/59 X |

FOREIGN PATENT DOCUMENTS

| 944679 | 4/1949 | France ............................... 189/76 |
| 1025347 | 4/1966 | United Kingdom ................ 211/191 |

*Primary Examiner*—Werner H. Schroeder
*Assistant Examiner*—C. J. Arbes
*Attorney, Agent, or Firm*—Robert E. Burns; Emmanuel J. Lobato; Bruce L. Adams

[57] ABSTRACT

A fence is assembled from tubular posts and open-ended tubular cross-pieces the ends of which are slidably supported on the posts and selectively secured in one of several discrete positions, for example by engaging transverse slots in the lower face of the cross-pieces on tabs in apertures in the posts. In another arrangement, flaps in the posts are folded in to form apertures slidably receiving ends of the cross-pieces, which are secured by selectively engaging pins in aligned holes in the flaps and cross-pieces. The fence may include a rectangular gate frame formed by folding a suitably cut-out tubular piece.

2 Claims, 13 Drawing Figures

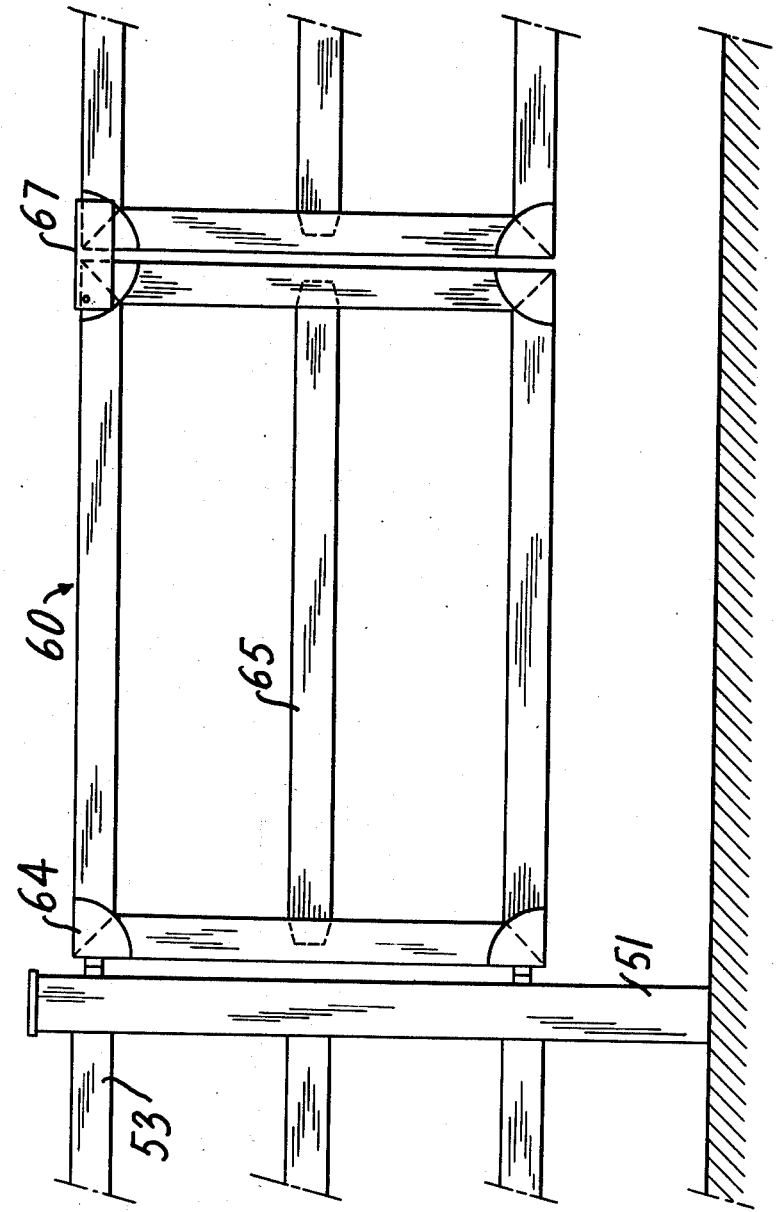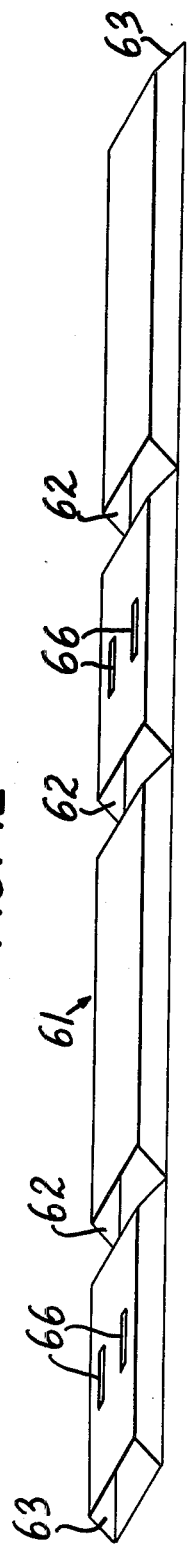

TUBULAR FENCE

This is a divisional, of application Ser. No. 568,817, filed Apr. 17, 1975.

The invention relates to fences, railings and similar barriers for enclosing or bordering fields, gardens, parking spaces, terraces, balconies and so forth, and which will hereinafter be referred to simply as fences.

An object of the invention is to provide a fence construction kit which can readily be assembled to form a fence. According to the invention, such a construction kit comprises a plurality of tubular posts, a plurality of tubular cross-pieces of generally uniform cross-section along their entire length and having like first and second ends, means for supporting the ends of the cross-pieces on the posts when the posts are upstanding and with the cross-pieces transverse to the posts while allowing a relative movement of the cross-pieces and posts along the direction of the cross-pieces, and means for securing the cross-pieces in any one of several positions relative to the posts along said direction.

The invention also concerns a fence assembled from such a kit.

Embodiments of the invention will now be described, by way of example, with reference to the accompanying schematic drawings, in which:

FIG. 11 is a side-elevational view of part of a fence supporting a gate; and

FIG. 12 is a perspective view of a tube for forming a frame of the gate shown in FIG. 11.

All of the embodiments comprise open-ended tubular posts and cross-pieces of pressed, rolled or drawn steel, aluminum, or other suitable materials such as extruded plastics, all either untreated or treated by appropriate means such as galvanizing, painting, or coating with a plastics material.

Figure 1:
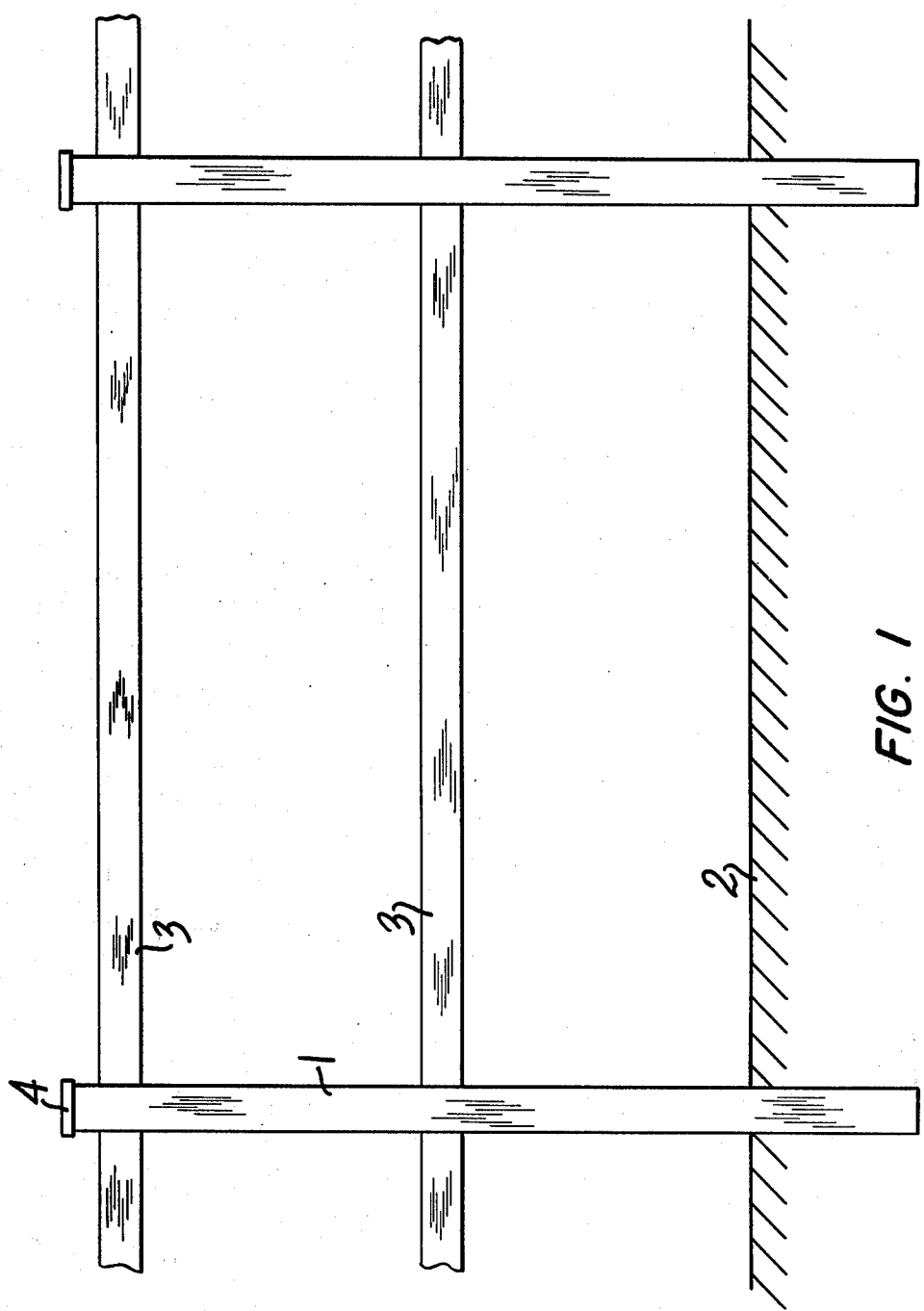
FIG. 1 is a side elevational view of part of an assembled fence.

The fence shown in FIG. 1 includes vertical posts 1 driven in the ground 2 with a suitable spacing slightly less than the length of cross-pieces 3. The open upper ends of posts 1 are covered by clip-on caps 4, and adjacent posts 1 are joined by pairs of horizontal cross-pieces 3.

Figure 2:
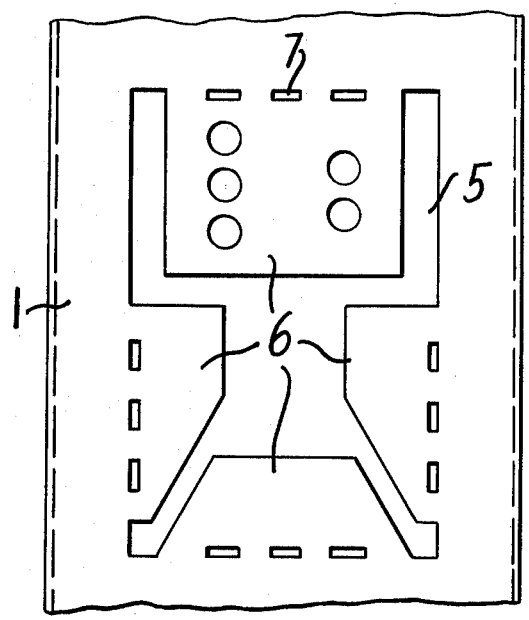
FIG. 2 is an enlarged scale elevational view of a part of a post of FIG. 1, prior to assembly.

Each post 1 has, on opposite faces and at the same heights, several pairs of cut-outs 5 (FIG. 2) each defining four flaps 6 with weakened lines of perforations 7 about which the flaps 6 can be folded inwards, perpendicular to the axis of post 1, to form a rectangular aperture 8 which slidably receives the end of a cross-piece 3.

The uppermost flap 6 has two lines of holes 9, and an upper face of the ends of cross-pieces 3 is provided with corresponding pairs of holes, not shown. Each cross-piece 3 is secured in an aperture 8 by inserting a pin 10 through a hole 9 aligned with a hole in cross-piece 3.

Assembly of the described fence is straightforward. Prior to or after driving the posts 1 in the ground, the flaps 6 of cut-outs 5 at the heights selected for fitting cross-pieces 3 are folded inwards about perforations 7 to form rectangular apertures 8. The lower cross-piece 3 is then slidably supported in its opening 8 and, once its longitudinal position relative to the post 1 has been set, a pin 10 is introduced through the open end of post 1 and inserted in whichever of holes 9 is aligned with a hole in cross-piece 3. As convenient, one or both ends of the lower cross-pieces 3 are secured in this way, before securing the upper cross-pieces 3 in a similar manner and fitting caps 4. Any unused cut-outs 5 can, if desired, be covered by removable caps, not shown, for example caps with integral clips or studs which are plugged in perforations 7.

Figure 4:
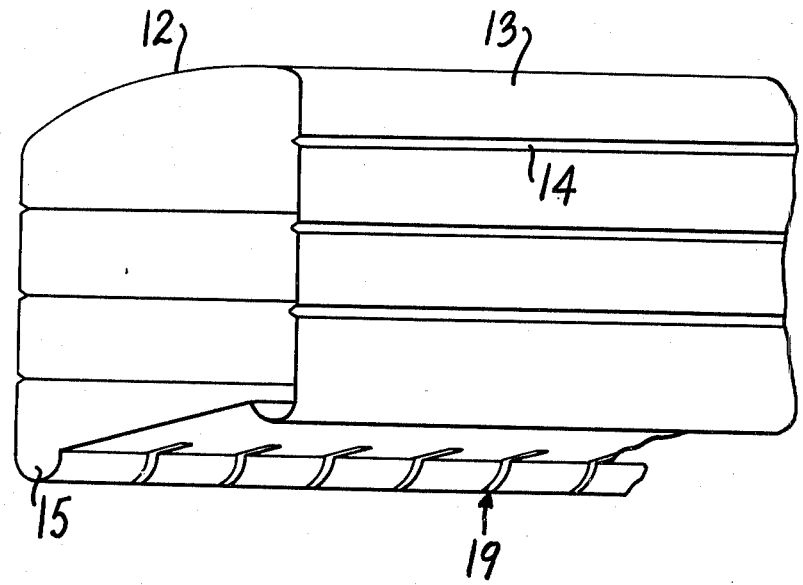
FIG. 4 is perspective view of an end of a cross-piece of another embodiment of fence.
Figure 5:
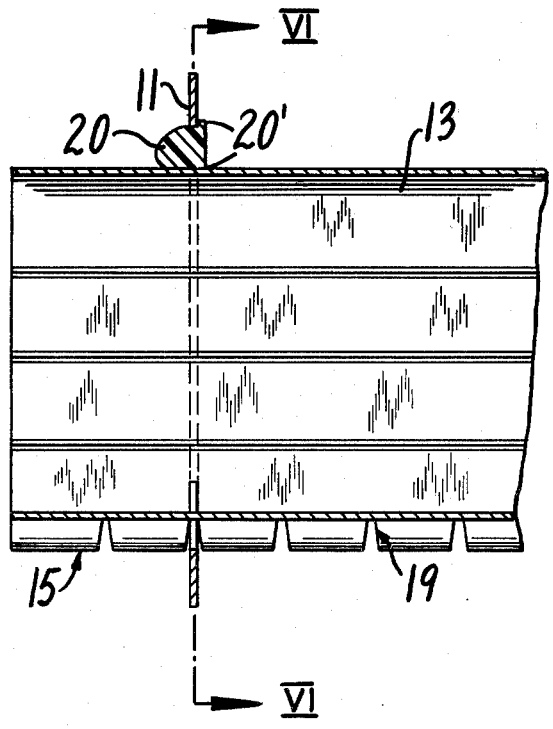
FIG. 5 is a cross-section taken along line V—V of FIG. 6 showing the cross-piece of FIG. 4 secured on a post.
Figure 6:
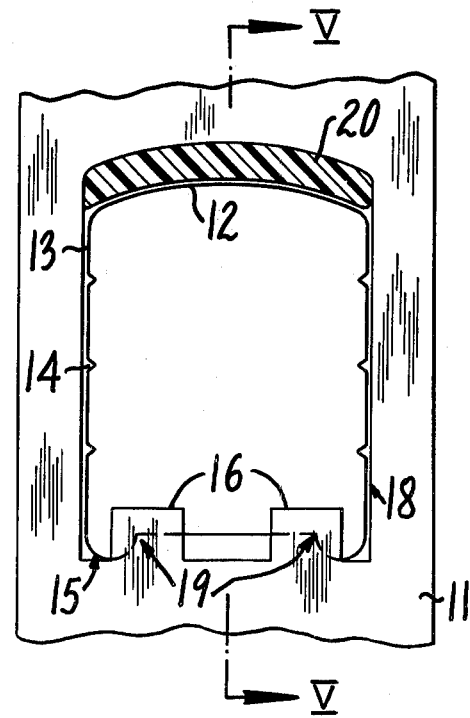
FIG. 6 is a cross-section along line VI—VI of FIG. 5.

FIG. 4 shows a different type of tubular cross-piece 13 with a uniform generally rectangular cross-section having a curved top wall 12, longitudinal reinforcements formed by ribs 14 along its side walls, and longitudinal bulges 15 at the edges of its lower wall. At each open end, the cross-pieces 13 have a plurality of pairs of transverse recesses in the form of notches 19 in the lower wall and extending partly through the bulges 15. The pairs of notches 19 cooperate with corresponding pairs of rectangular tabs 16 on the lower edge of a generally rectangular aperture 18 cut out in a post 11, (FIG. 5), whereby the positions of cross-pieces 13 are set relative to posts 11 by selection of the notches. Members 20 of resilient material are then jammed or wedged between the curved upper edges of aperture 18 and walls 12 of cross-pieces 13, to lock the cross-pieces 13 in their selected positions. As shown, the members 20 advantageously have a generally $\Omega$-shaped cross-section with lips 20' which provide a sealing fit. When a cross-piece 13 is fitted on a post 11, the notches 19 between bulges 15 are not normally in view.

Figure 3:
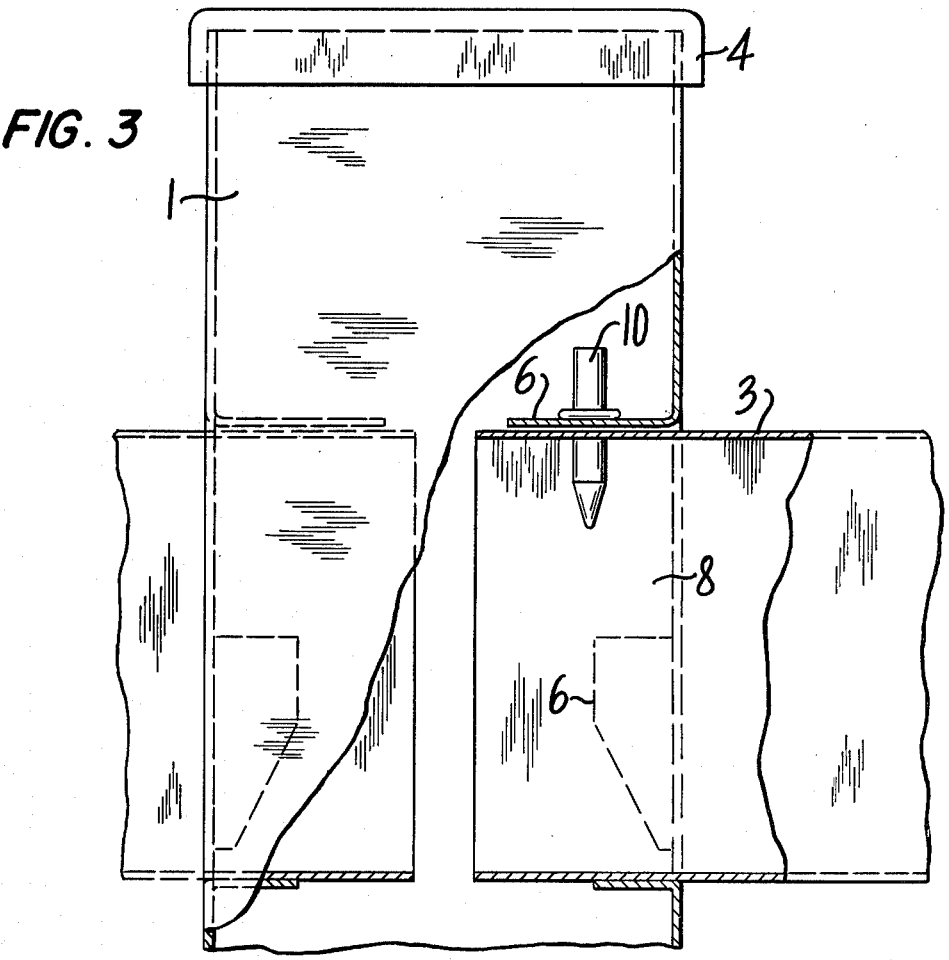
FIG. 3 is an enlarged scale side elevational view of a detail of FIG. 1, partly cut away and in cross-section.
Figure 7:
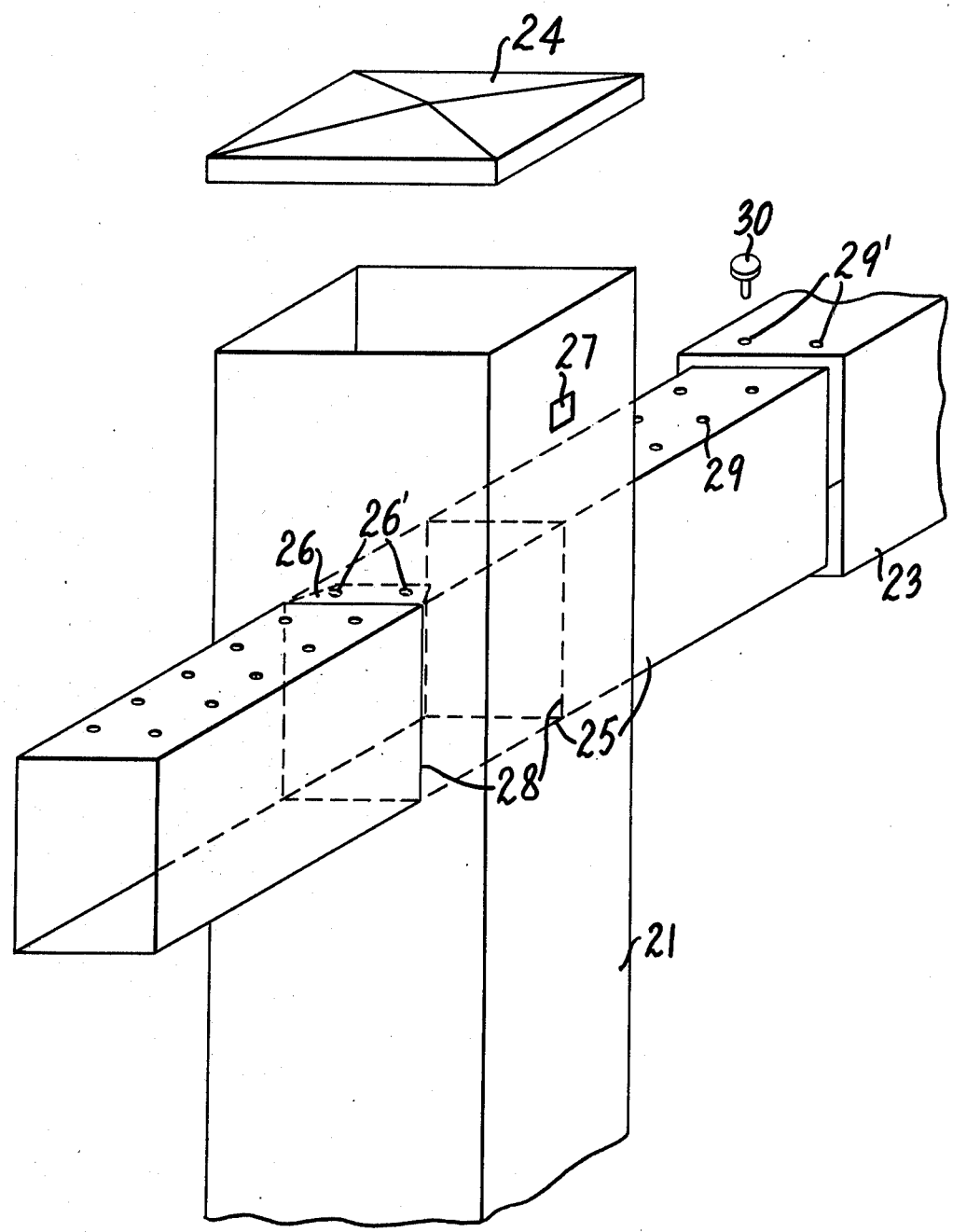
FIG. 7 is an exploded perspective view showing the assembly of part of another embodiment.

In FIG. 7, cross-pieces 23 are supported on posts 21 by means of a tube 25 forming an elongate male element which can be slidably received in the open ends of cross-pieces 23. The tube 25 passes through a pair of aligned rectangular apertures 28 on opposite faces of a post 21, so that ends of the tube 25 protrude perpendicular to post 21. The apertures 28 are formed, as the apertures 8 of FIG. 3, by inwardly folding flaps 26 perpendicular to the axis of post 21, only one of the flaps 26 being shown. The upper faces of tubes 25 have a series of pairs of holes 29, and corresponding holes 26' and 29' are provided respectively in the upper flaps 26 and in the ends of cross-pieces 23. The tubes 25 are thus secured to posts 21, and the cross-pieces 23 to tubes 25 in selected positions, by inserting pins 30 in aligned holes 26', 29 and 29', 29 respectively. The open top ends of posts 21 are closed by cap 24, and the posts 21 may, as shown, have holes 27 at a given location for fitting insulating blocks adapted to support an electric wire, or barbed wire.

Figure 8:
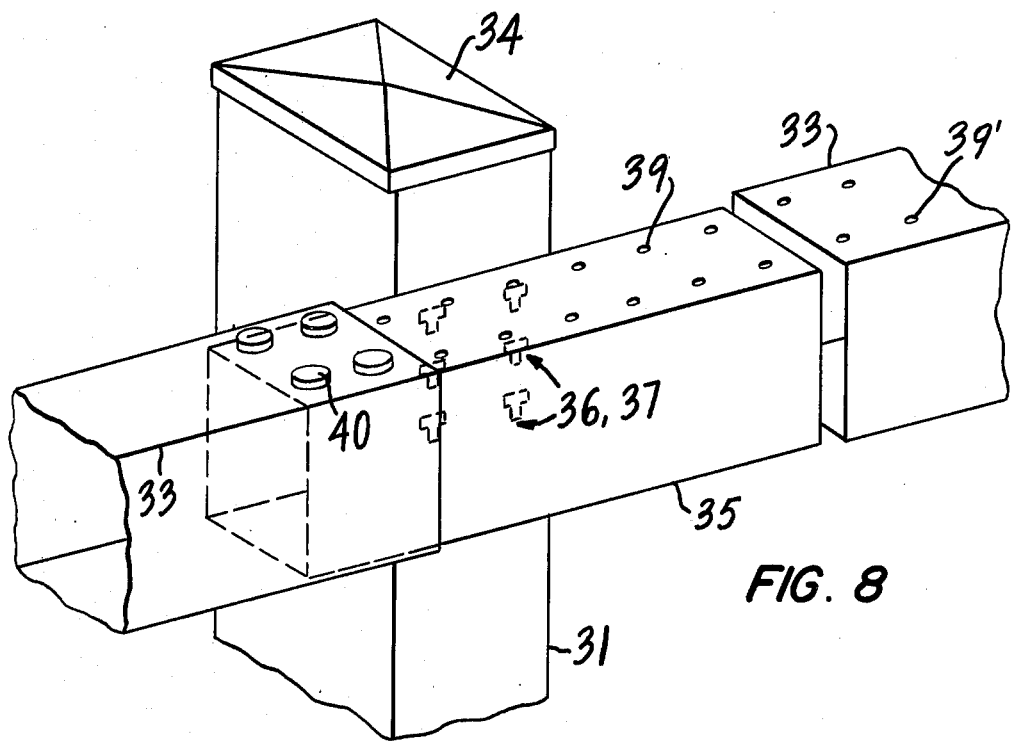
FIG. 8 is a view similar to FIG. 7 of a further embodiment.
Figure 9A:
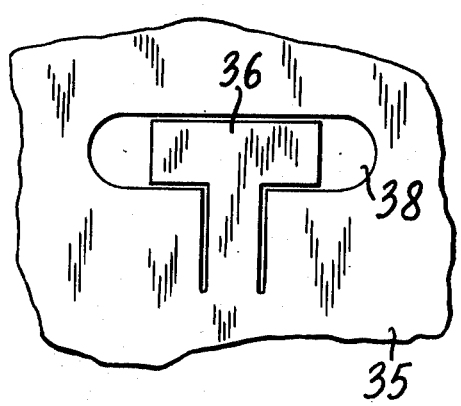
FIGS. 9A and 9B show, on an enlarged scale, details of FIG. 8.
Figure 9B:
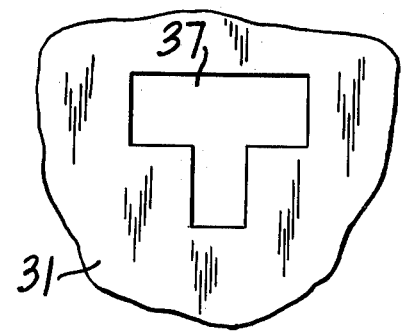

FIG. 8 shows an arrangement in which cross-pieces 33 are slidably mounted on a tube 35 and secured in selected positions by fitting headed pins 40 in aligned holes 39 and 39'. However, in contrast to the arrangement of FIG. 7, the tubes 35 are mounted externally of posts 31 by means of several projections 36 on tubes 35 which are inserted in corresponding openings 37 in posts 31. As shown in FIG. 9A, each projection 36 is formed as a T-shaped tongue cut out in tube 35 with finger-holes 38 adjacent the ends of the bar of the T. The openings 37 in posts 31 have a corresponding T-shape of slightly greater dimensions. The tongues 36 are resilient but can be bent by the user out of the plane of the adjacent face of tube 35, this being facilitated by the provision of finger holes 38. Then, the bars of the tongues 36 are inserted through the corresponding parts of openings 37 so that when the tube 35 is lowered, the ends of these bars jam against the inner face of post 31 adjacent the stems of the T-shaped openings 37.

Figure 10:
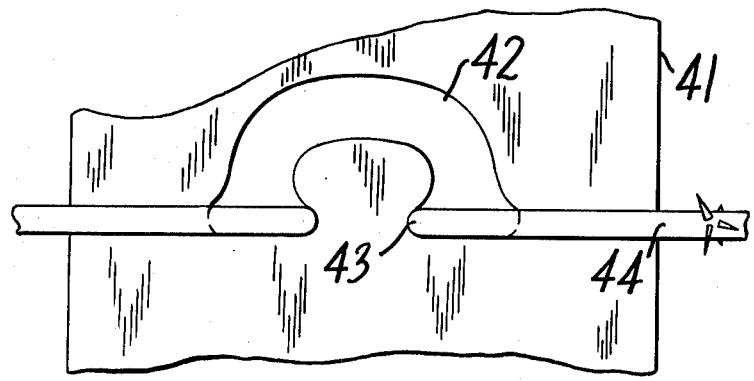
FIG. 10 is a view of an optional feature.

FIG. 10 shows a tubular post 41 according to any of the preceding embodiments provided at a given location with an opening 42 of an inverted generally U or C-shape widened at its ends 43 to receive a barbed or other wire 44, which can be easily fitted and removed at will.

FIG. 11 shows a gate 60 mounted between two parts of a fence formed by upright posts 51 and cross-pieces 53, for example according to the embodiments of FIGS. 1 to 3, FIGS. 4 to 6 or FIG. 7.

The gate 60 is made up of two frames each formed by a rectangular tube 61 (FIG. 12) having three generally wedgelike cut-outs 62 in three of its faces at locations corresponding to corners of the frame, and ends 63 cut at 45°. The cut-outs are shaped so that when the tube 61 is bent about its uninterrupted face at the apices of the cut-outs, it forms a rectangle, with three corners formed by the joined-together cut-outs 62 and the fourth corner by the ends 63. Reinforcing parts 64 are rivetted at the four corners of the frame 60, either internally or, as shown, externally.

An optional cross-bar 65 can be fitted in the gate by providing pairs of slots 66 in the appropriate faces of tube 61, which slots receive complementary ends of the cross-bar 65 during the folding operation.

Each gate frame is hinged on a post 51 by means which enable the location of the vertical pivoting axis to be adjusted in the direction of cross-pieces 53. Such means for example include a bolt or bracket mounted perpendicular to post 51 by means of securing plates clamped in an aperture in the post, and supporting a vertical hinge pin at a given adjustable location. The reinforcing parts 64 at the corresponding edge can each be provided with a bracket having an opening or sleeve which engages on the hinge pin to pivotally suspend the gate.

A latch for closing the two frames of the gate is conveniently formed by a channel-piece 67 engageable over the upper pair of adjacent parts 64 of the two frames, and pivotally mounted on one of these parts.

It is understood that various modifications may be made to the described embodiments and, in particular, features of one embodiment may, where appropriate, be incorporated in another embodiment. For example, the cross-pieces 3 of FIGS. 1 and 3 could be provided with reinforcing ribs 14 and/or with bulges 15 as shown in FIG. 4. Also, for the embodiment of FIGS. 1 to 3, instead of the uprights 1 having their flaps 6 with lines of weakness ready to be folded at the moment of erection, these flaps cold be prefolded notably in the case where the uprights are of plastics material and the folding operation requires the application of heat. The posts and cross-pieces could have a cross-sectional shape other than rectangular, for example circular, as could the tube 61, FIG. 10, whose cut-outs would be appropriately shaped to enable the bending.

The described embodiments can all be easily assembled without skilled labour and without a need to employ nuts and bolts. The provision of several easily selectable discrete relative positions of the cross-pieces and posts facilitates assembly and avoids a need to cut the cross-pieces to length.

What is claimed is:

1. A fence construction kit comprising, a plurality of individual tubular posts, a plurality of tubular cross-pieces each of generally uniform cross-section along its entire length and having alike opposite open ends, a plurality of male tubular intermediate elements insertable in the open ends of adjoining tubular cross-pieces for joining the cross-pieces and for releasably supporting the cross-pieces on the posts when the posts are disposed upstanding with the cross-pieces extending in opposite directions from the individual upstanding posts, said intermediate elements being dimensioned for relative movement in an axial direction internally of corresponding cross-pieces within which they are received, means for releasably securing the intermediate members relative to said corresponding cross-pieces in any of several axial positions along said axial direction, securing means jointly on the posts and the intermediate elements for releasably mounting and securing the intermediate elements in any one of several axial positions relative to the posts along said axial direction for supporting the cross-pieces on said upstanding posts in a fence configuration, said securing means comprising through openings in the individual tubes through which corresponding individual intermediate elements extend transversely, said intermediate elements each having openings disposed within a corresponding post when disposed transversely thereof, and at least one flap internally of each post having holes for receiving locking means releasably fixing the corresponding intermediate element relative to the flap.

2. A fence construction kit according to claim 1, in which said intermediate elements are mounted in use transversely of the corresponding posts externally thereof, and said securing means comprising projections on said posts received in corresponding holes on the intermediate elements.

* * * * *